United States Patent [19]
Morita et al.

[11] Patent Number: 5,844,879
[45] Date of Patent: Dec. 1, 1998

[54] OPTICAL HEAD INCLUDING RING-SHAPED LIGHT BLOCKING OR LIGHT NON-CONVERGING PORTION

[75] Inventors: Hideji Morita, Higashihiroshima; Yasusi Seike, Toyonaka, both of Japan

[73] Assignee: Sharp Kabushiki Kaisha, Osaka, Japan

[21] Appl. No.: 828,504

[22] Filed: Mar. 31, 1997

[30] Foreign Application Priority Data

May 24, 1996 [JP] Japan ..................................... 8-130167

[51] Int. Cl.⁶ ........................... G11B 7/125; G11B 7/135; G11B 15/12
[52] U.S. Cl. ............................. 369/118; 369/112; 369/94; 369/44.23
[58] Field of Search .................................... 369/112, 103, 369/44.23, 44.24, 118, 109, 94

[56] References Cited

U.S. PATENT DOCUMENTS

| 5,523,338 | 6/1996 | Hasman et al. | 369/109 |
| 5,638,353 | 6/1997 | Takahashi | 369/112 |
| 5,708,641 | 1/1998 | Choi et al. | 369/112 |

FOREIGN PATENT DOCUMENTS

| 62-3441 | 9/1987 | Japan . |
| 1-3833 | 9/1989 | Japan . |
| 3-62342 | 3/1991 | Japan . |
| 6-20298 | 1/1994 | Japan . |

*Primary Examiner*—Tod R. Swann
*Assistant Examiner*—Kim-Kwok Chu
*Attorney, Agent, or Firm*—Nixon & Vanderhye P.C.

[57] ABSTRACT

A masking member is provided so as to move in an interlocked manner with a shift of an objective lens designed for a high-density disk. Since the masking member reduces an effective numerical aperture (NA) of the objective lens, and greatly reduces affection of aberration, the objective lens allows a CD whose substrate is thicker than that of the high-density disk to be stably reproduced. Also, for example, even when the objective lens moves in a track direction of the high-density disk or CD, the masking member follows that movement. Therefore, a suitably sized light spot is formed on a signal surface of the high-density disk or CD. Especially, a light flux having passed inside the masking member with relatively small aberration is used to form a suitably sized light spot on the signal surface of the CD.

15 Claims, 11 Drawing Sheets

FIG.2(a)
FIG.2(b)
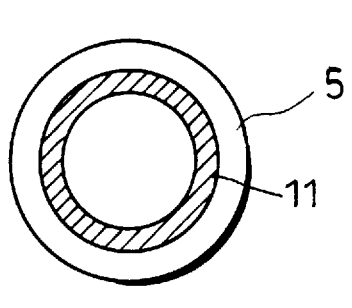
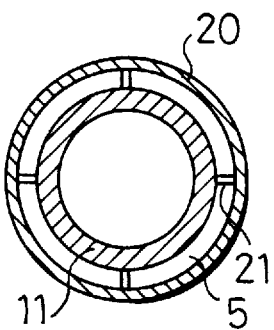
FIG.3
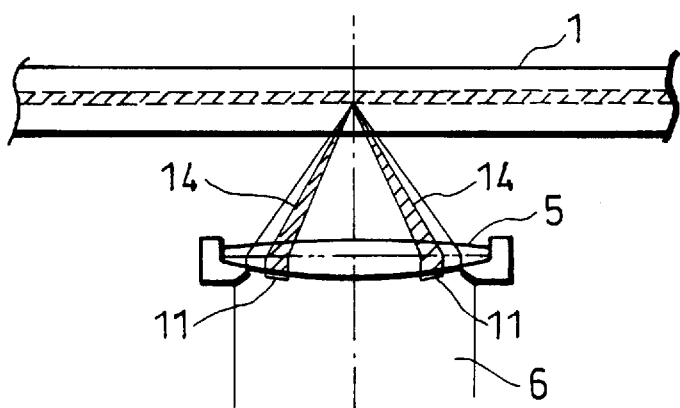
FIG.4
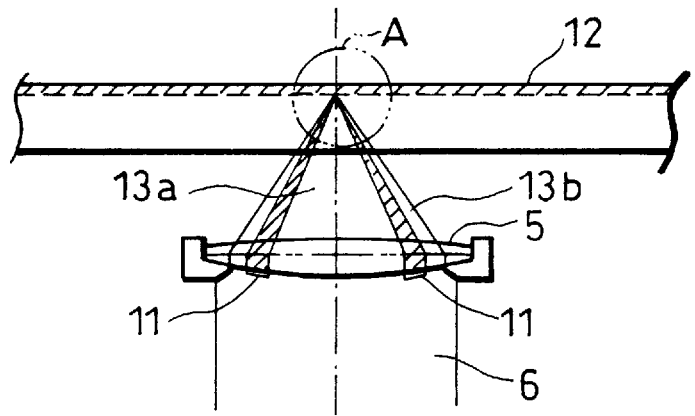

SIGNAL SURFACE

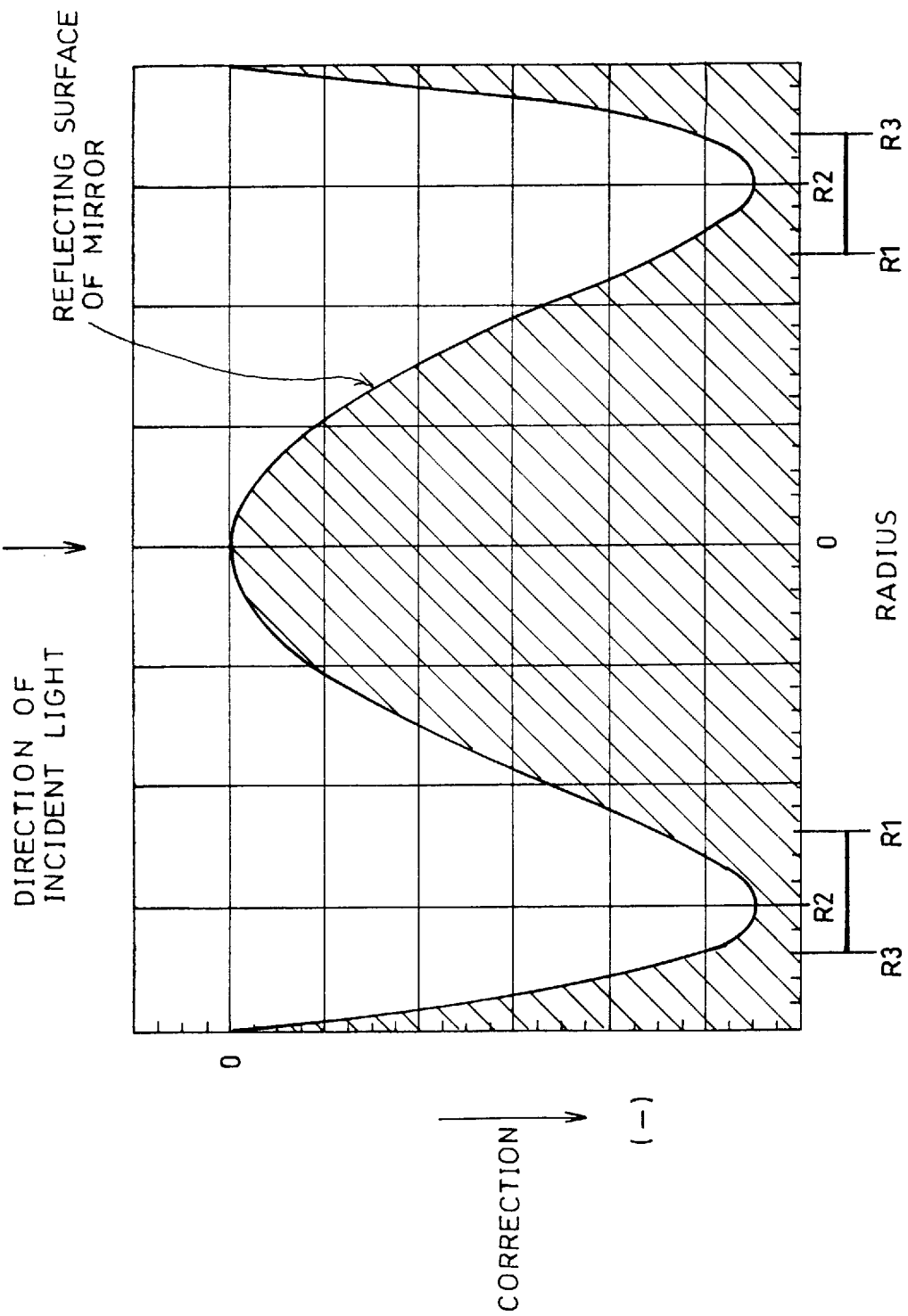

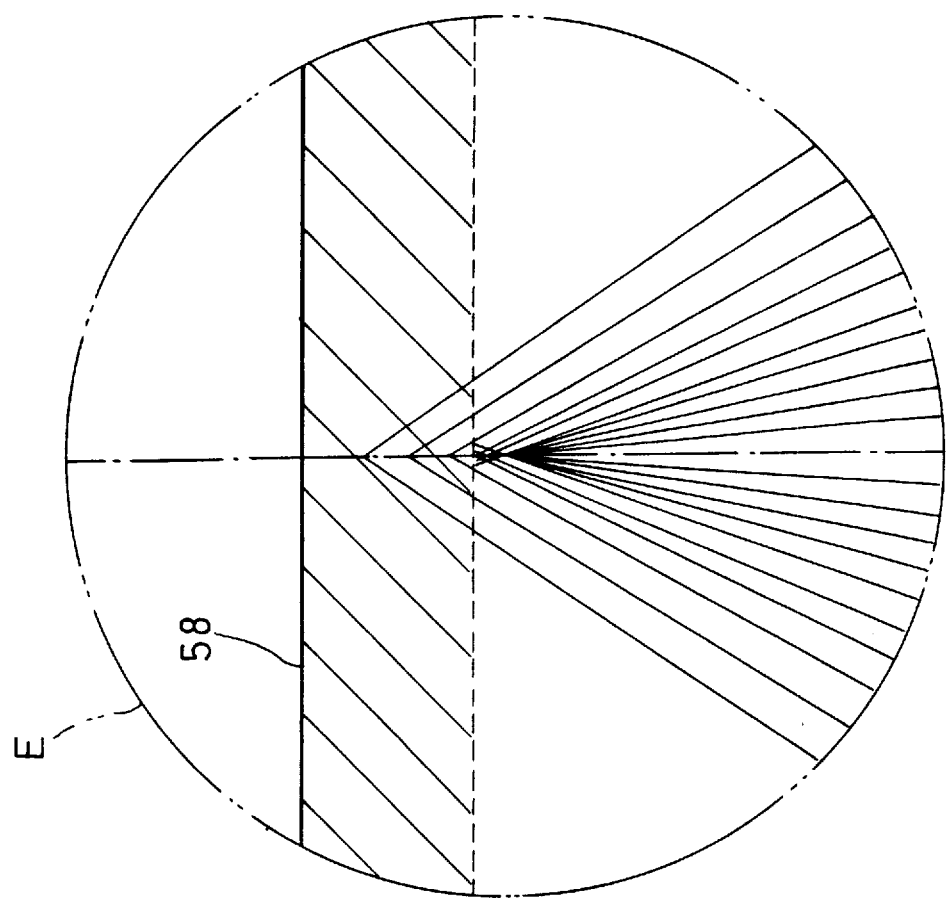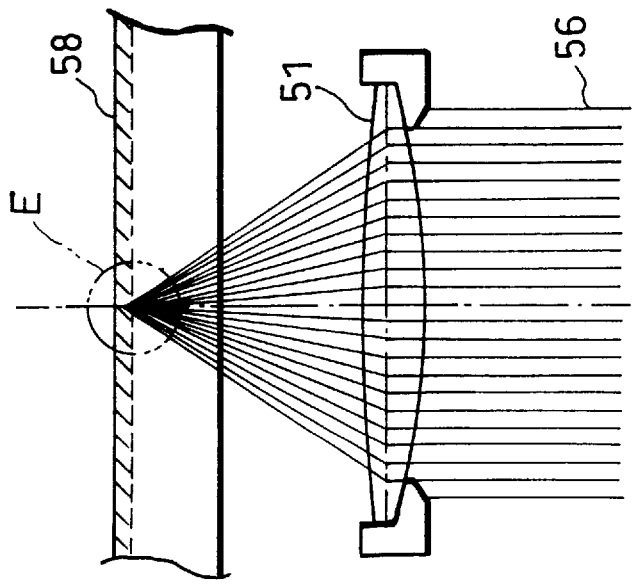

5,844,879

OPTICAL HEAD INCLUDING RING-SHAPED LIGHT BLOCKING OR LIGHT NON-CONVERGING PORTION

FIELD OF THE INVENTION

The present invention relates to an optical recording and reproducing device for recording, reproducing and erasing information on an information recording medium with radiation of a light beam.

BACKGROUND OF THE INVENTION

Studies are being conducted on optical recording and reproducing devices for recording, reproducing and erasing information on an information recording medium with radiation of a light beam. Especially, a lot of efforts are being made now to realize an optical recording and reproducing device which, even when used alone, is capable of recording, reproducing and erasing information on information recording media whose thicknesses and recording densities are different from each other.

For example, Japanese Laid-Open Patent Application No. 6-20298/1994 (Tokukaihei 6-20298) discloses an optical system that limits a light flux striking an objective lens by providing in an optical path an aperture member having an aperture section of an effective radius regulated by the effective numerical aperture (NA) of the objective lens.

The optical system, as shown in FIG. 12, has an aperture diaphragm adjusting section 52 between a collimating lens 50 and an objective lens 51. The aperture diaphragm adjusting section 52 is composed of an aperture member 53 formed in, for example, a square shape and an actuator 54 for supporting the aperture member 53. At the center of the aperture member 53 is formed an aperture section 53a which is cut through with a round aperture. The radius of the aperture section 53a is regulated by the effective NA of the objective lens 51 as mentioned above. The actuator 54 pushes the aperture member 53 into a light flux 55 and pulls the aperture member 53 out of the light flux 55 by moving the aperture member 53 vertically to the light flux 55.

With the configuration, light radiating from a light source (not shown) is converted into the parallel light flux 55 by the collimating lens 50. When the aperture member 53 is pushed into the light flux 55, the light flux 55 is partly blocked by the aperture section 53a of the aperture member 53, thereby only leaving a light flux 56 striking the objective lens 51. The light flux 56 is converged by the objective lens 51 to form a suitably sized light spot on a disk (not shown) as an information recording medium.

When the aperture member 53 is not pushed into the light flux 55, the light flux 55 strikes the objective lens 51 without changing the radius thereof to form on the disk a light spot of a size in accordance with the radius thereof.

The radius of the light striking the objective lens 51 is switched in this manner depending on whether or not the aperture member 53 is pushed into the light flux 55. Therefore, with the configuration, the effective NA of objective lens 51 can be changed, and the size of the light spot formed on the disk can be changed suitably to the type of disks by pushing the aperture member 53 into the light flux 55 and pulling the aperture member 53 out of the light flux 55. As a result, the optical recording and reproducing device, even when used alone, can record, reproduce and erase information on information recording media whose thicknesses and recording densities are different from each other.

It is generally known that as to information recording media whose thicknesses are different from each other, a small effective NA of the objective lens 51 can restrain affection of aberration to a degree that the affection is negligible, and form a sufficiently small light spot on the information recording medium.

However, the configuration disclosed in the patent application increases the size of the device, because of the inclusion of a mechanism, such as the actuator 54, for pushing the aperture member 53 into the light flux 55 and pulling the aperture member 53 out of the light flux 55 and a drive circuit (not shown) for driving the mechanism.

Besides, with the configuration, the objective lens 51 possibly follows, for example, eccentricity of the disk and shifts in a track direction of the disk. The light flux 56 limited by the aperture member 53 does not strike the correct region on the objective lens 51, causing a problem of not being able to change the size of the light spot formed on the disk suitably to various kinds of disks.

In addition, when a high-density disk 57 is used with a conventional optical system as shown in FIG. 13, a suitably sized light spot is formed on a signal surface of the high-density disk 57. Consequently, it is possible to stably record, reproduce and erase information on the high-density disk 57. On the contrary, when a compact disk (CD) 58 is used with the optical system as shown in FIG. 14(a), the optical system is seriously affected by aberration, and thereby fails to form a sufficiently small light spot on the signal surface of the CD 58 as shown in FIG. 14(b) which is an enlarged view of Section E of FIG. 14(a). Consequently, it is impossible to stably record, reproduce and erase information on the CD 58.

SUMMARY OF THE INVENTION

An object of the present invention is to offer an optical recording and reproducing device which, even when used alone, is capable of stably recording, reproducing and erasing information on information recording media whose thicknesses and recording densities are different from each other, by suitably forming on the information recording media a light spot of a size suitable to the information recording media.

In order to accomplish the object, the optical recording and reproducing device in accordance with the present invention is characterized in that it has:

a light source for irradiating an information recording medium with a light beam;

an objective lens for converging the light beam on the information recording medium; and light blocking means, provided in an optical path between the light source and the information recording medium, for blocking a part of the light beam, the light blocking means being formed in a ring shape that is concentric with the objective lens.

With the configuration, light radiating from the light source, before reaching the information recording medium, is partly blocked by the light blocking means formed in a ring shape that is concentric with the objective lens. A light beam not having been blocked by the light blocking means, that is, a light beam having passed inside or outside the light blocking means is converged by the objective lens and forms on the information recording medium a light spot of a size suitable to the information recording medium.

In other words, the configuration needs no conventional device for pushing/pulling a member for limiting the radius of the light beam into/out of the optical path. A light spot of a size suitable to the information recording medium can be always formed on the information recording medium, simply by placing the light blocking means in the optical path between the light source and the information recording medium. Since the configuration needs no such conventionally essential device, the configuration can simplify and thereby reduce the size of the information recording and reproducing device, and can also reduce the number of components and thereby largely cut the cost of the information recording and reproducing device. Also, since the configuration does not require switching of the effective NA of the objective lens according to the thickness of the information recording medium, the configuration can minimize the start-up time of the player.

For a fuller understanding of the nature and advantages of the invention, reference should be made to the ensuing detailed description taken in conjunction with the accompanying drawings.

BRIEF DESCRIPTION OF THE DRAWINGS

FIG. 2(a) is a plan view showing a masking member attached to an objective lens, and FIG. 2(b) is a plan view showing a masking member attached to an objective lens together with a supporting member and a connecting member.

FIG. 3 is an explanatory view illustrating reproduction of a high-density disk.

FIG. 4 is an explanatory view illustrating reproduction of a CD.

FIG. 6 is a cross-sectional view showing an aberration correcting mirror.

FIG. 14(a) is an explanatory view illustrating reproduction of a CD with the optical recording and reproducing device, and FIG. 14 (b) is an enlarged view of Section E of FIG. 14(a).

DESCRIPTION OF THE EMBODIMENT

Referring to FIGS. 1 through 11, the following description will discuss an embodiment in accordance with the present invention.

Figure 1:
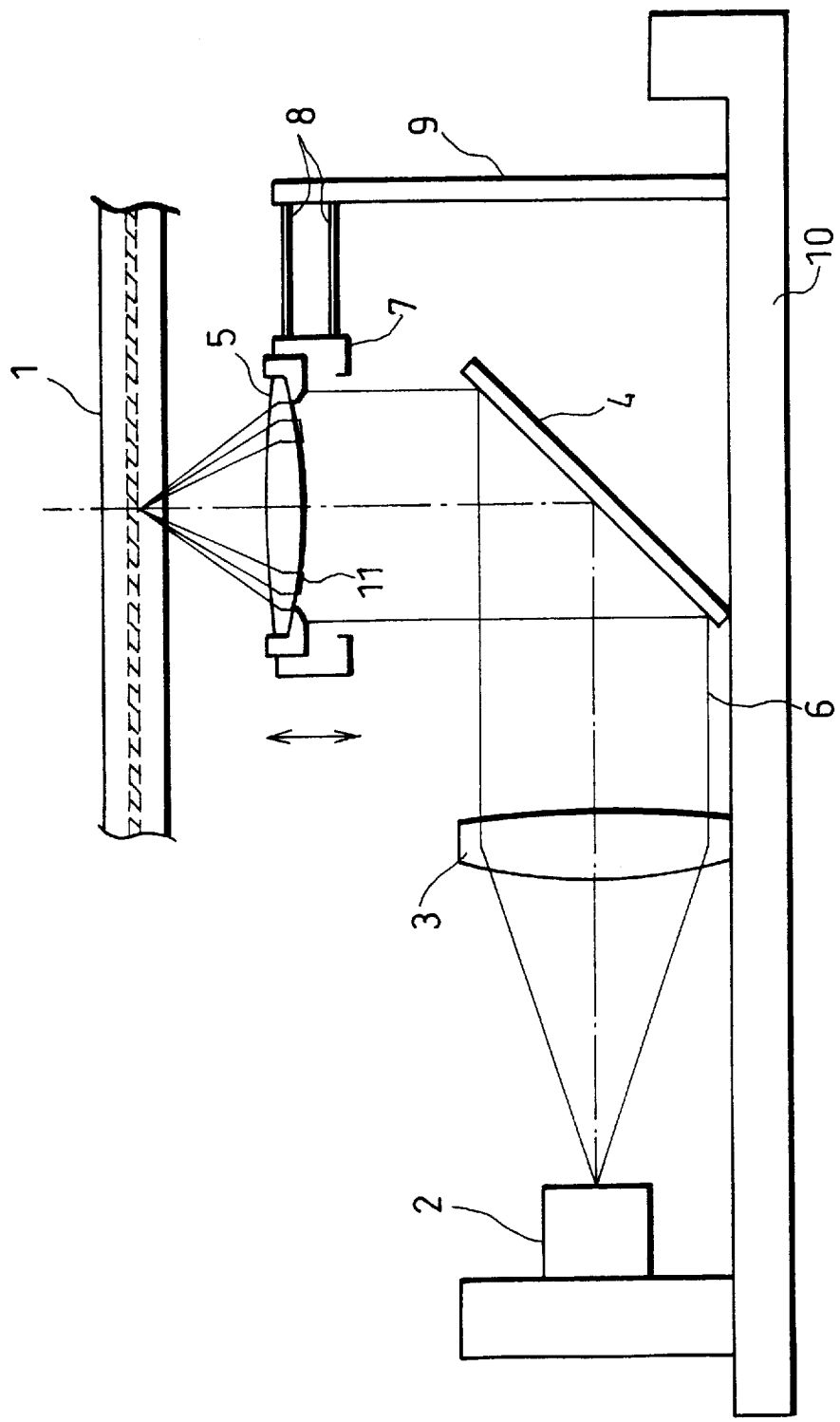
FIG. 1 is an explanatory view showing a configuration example of an optical recording and reproducing device in accordance with the present invention.

FIG. 1 illustrates reproduction of a high-density disk (first information recording medium) 1 formed by combining two 0.6-millimeter-thick substrates that are being developed in recent years, using a configuration adopted in an optical recording and reproducing device in accordance with the present invention. As shown in FIG. 1, the optical recording and reproducing device is composed of a light source 2, a collimating lens 3, a reflection mirror 4 and an objective lens 5.

The collimating lens 3 converts light radiating from the light source 2 into a parallel light flux 6. The reflection mirror 4 is disposed to reflect the light flux 6 coming from the collimating lens 3 and guide the light flux 6 to the objective lens 5. The objective lens 5 converges the light flux 6 that strikes the objective lens 5, so as to form a light spot on a signal surface of high-density disk 1.

The objective lens 5 is designed for a disk having a 0.6-millimeter-thick substrate, and is attached to a holding body 7. The holding body 7 is supported by a flexible supporting member 8 that can swing in any direction. A base 9 supporting the supporting member 8 is attached to a housing 10 together with the light source 2, the collimating lens 3 and the reflection mirror 4.

A half-transparent or opaque masking member (light blocking means) 11 for blocking a part of the light flux 6 striking the objective lens 5 is provided so as to move in an interlocked manner with a shift of the objective lens 5. In the present embodiment, the masking member 11 is provided on the side of the objective lens 5 which the light flux 6 strikes. FIG. 2(a) is a plan view showing the masking member 11 attached to the objective lens 5.

As shown in FIG. 2 (a), the masking member 11 is formed in a ring shape that is concentric with the objective lens 5. Therefore, the light flux 6 striking the objective lens 5 is substantially separated into the light flux passing inside the masking member 11 and the light flux passing outside the masking member 11.

A half-transparent masking member 11 is made of, for example, a material used for a half mirror that is generally adopted in an optical system of a pickup, that is, a dielectric multilayer film formed on a flat glass surface. The half-transparent masking member 11 is formed by masking the central and peripheral regions on the objective lens 5, and forming the dielectric multilayer film on the non-masked region with vapor deposition. The quantity of light passing through the half-transparent masking member 11 is adjustable during a process of forming the dielectric multilayer film. Alternatively, the half-transparent masking member 11 is formed of a material other than the dielectric multilayer film, such as, a dying material used for spectacles.

The masking member 11 formed of such a half-transparent material blocks only a small quantity of light during reproduction of, for example, the high-density disk 1. In other words, the signal surface of the high-density disk 1 is irradiated with a large quantity of light, thereby enabling the high-density disk 1 to be stably reproduced. The half-transparent masking member 11 also enables a disk of a low reflectance and a multilayered disk to be stably reproduced.

An opaque masking member 11 is made with the same method as the half-transparent masking member 11, with only a change in, for example, the film thickness of the dielectric multilayer film so that light does not pass through the masking member 11. Alternatively, the opaque masking member 11 is made of a metal or resin with an etching method.

A preferred method of forming the half-transparent or opaque masking member 11 on the objective lens 5 is, as shown in FIG. 2(b), to provide a supporting member 20 on the peripheral region on the objective lens 5, and then form the masking member 11 via connecting members 21 inside the supporting member 20. Since the masking member 11 is formed by using the supporting member 20 as the reference position, the center of the masking member 11 and that of the objective lens 5 coincide more correctly.

In the present embodiment, although the masking member 11 is directly formed on the objective lens 5, there is an alternative. For example, the masking member 11 is formed on a flat glass sheet (not shown), and that flat glass sheet is placed on one of sides of the objective lens 5 which the light flux 6 strikes, so as to form a single unit with the objective lens 5 and move in an interlocked manner with a shift of the objective lens 5.

Referring to FIG. 1, the following description will explain an operation for reproduction of the high-density disk 1.

Light radiating from the light source 2 travels via the collimating lens 3 and the reflection mirror 4, and strikes the objective lens 5 as the light flux 6. The light flux 6 is converged by the objective lens 5 to form a light spot on the signal surface of the high-density disk 1. The masking member 11 is formed on the objective lens 5, therefore blocking a part of the light flux 6 striking the objective lens 5 and forming a non-light flux portion 14 as shown in FIG. 3.

The formation of the non-light flux portion 14 slightly reduces the quantity of the light with which the high-density disk 1 is irradiated; however, this does not cause aberration. Therefore, light that has passed through the objective lens 5 without being blocked by the masking member 11 (i.e., the light flux having passed inside the masking member 11 and the light flux having passed outside the masking member 11) is converged by the objective lens 5 designed for the high-density disk 1 and forms a sufficiently small light spot on the signal surface of the high-density disk 1, enabling the high-density disk 1 to be little affected by aberration and stably reproduced.

Referring to FIG. 4, the following description will explain an operation for reproduction of a conventional 1.2-millimeter-thick compact disk (CD) (second information recording medium) 12. FIG. 4 schematically illustrates a configuration for the operation.

Light radiating from the light source 2 (see FIG. 1) travels via the collimating lens 3 and the reflection mirror 4 (see FIG. 1 for both), and strikes the objective lens 5 as the light flux 6 in the same manner as in reproduction of the high-density disk 1 (see FIG. 1). The light flux 6 is then converged by the objective lens 5 to form a light spot on a signal surface of the CD 12.

Figure 5A:
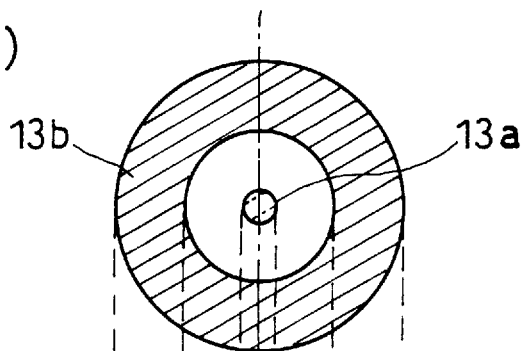
FIG. 5(a) is a plan view showing a spot region on a signal surface of the CD.
Figure 5B:
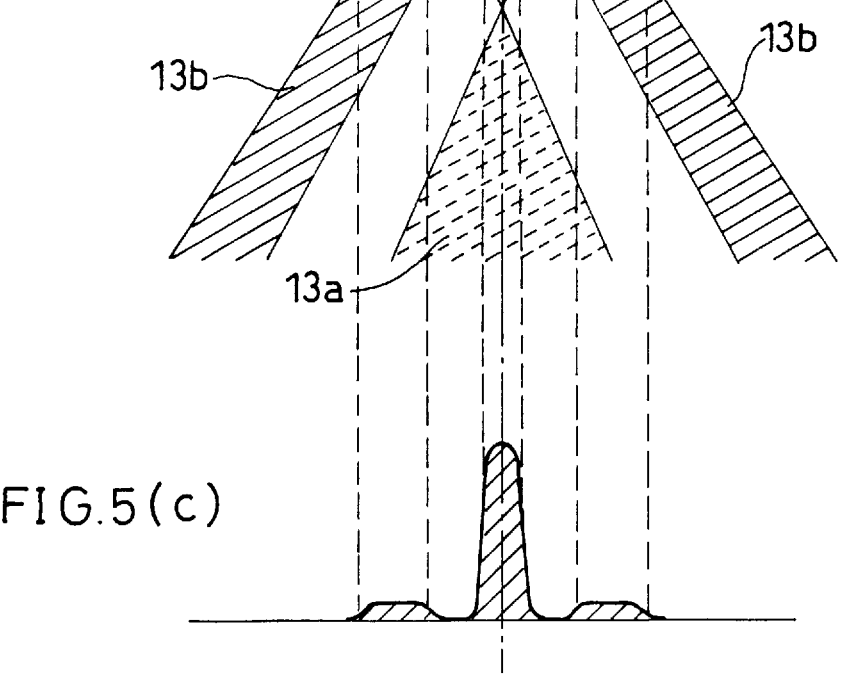
FIG. 5(b) is an enlarged view of Section A of FIG. 4.
Figure 5C:
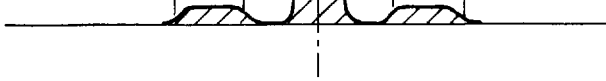
FIG. 5(c) is a drawing showing an intensity distribution of a light spot in the spot region.

FIG. 5(a) is a plan view showing a spot region on the signal surface of the CD 12, viewed from the side facing the objective lens 5. FIG. 5(b) is an enlarged view showing the spot region (an enlarged view of Section A of FIG. 4). FIG. 5(c) is a drawing showing an intensity distribution in the spot region.

As shown in FIGS. 5(a) and 5(b), a light flux 13a having passed inside the masking member 11 is little affected by aberration, forming a sufficiently small light spot.

A light flux 13b having passed outside the masking member 11 has great aberration, forms a spot at a different position from that of the spot formed by the light flux 13a, and is not converged. As a result, as shown in FIG. 5(c), the light flux 13a with which the signal surface of the CD 12 is irradiated gives enough light intensity for reproduction of the CD 12, whereas the light flux 13b only gives weak light intensity. Therefore, the light flux 13b does not affect reproduction of the CD 12. That is, the CD 12 is reproduced with the light flux 13a having passed inside the masking member 11 and forming a light spot on the signal surface of the CD 12.

As explained so far, the configuration needs no conventional device for pushing/pulling a member for limiting the radius of the light beam into/out of the optical path. That is, a light spot of a size suitable to an information recording medium to be used can be formed on the information recording medium, simply by always placing the masking member 11 in the optical path between the light source 2 and the high-density disk 1 (or CD 12).

Since the configuration needs no such conventionally essential device, the configuration can simplify the information recording and reproducing device and reduce the number of components, thereby largely cutting the cost of the information recording and reproducing device. Also, since the configuration does not require switching of the effective NA of the objective lens 5 according to the thickness of a disk, the configuration can minimize the start-up time of the player.

Since the masking member 11 is provided on the objective lens 5, that is, so as to move in an interlocked manner with a shift of the objective lens 5, even when the objective lens 5 moves in a track direction of the high-density disk 1 or CD 12, the masking member 11 follows that movement. As a result, even if the objective lens 5 moves as above, as to reproduction of the high-density disk 1, the light fluxes having passed inside and outside the masking member 11 are converged to form a sufficiently small light spot: as to reproduction of the CD 12, the light flux 13a having passed inside the masking member 11 with little aberration is converged to form a sufficiently small light spot.

Consequently, the present invention can offer a reliable and high quality information recording and reproducing device that can stably reproduce the high-density disk 1 and CD 12 and that is free from affection of, for example, the movement of the objective lens 5.

In addition, even when the CD 12, whose substrate is thicker than that of the high-density disk 1, is reproduced with the objective lens 5 designed for the high-density disk 1, the masking member 11 included in the configuration can reduce the effective NA regulating the spot size for reproduction of the CD 12 to about 0.45 and form a light spot having a spot radius that is conventionally used for reproduction of the CD 12. Therefore, the configuration can greatly reduce the affection of aberration and form a suitably sized light spot on the signal surface of a thick (e.g., 1.2 mm) low-density disk, using the objective lens 5 designed for a thin (e.g., 0.6 mm) high-density disk. That is, the configuration allows a single optical system to stably reproduce information recording media whose thicknesses and recording densities are different from each other.

It is known that when the CD 12 is to be reproduced without aberration with an optical system designed for the high-density disk 1, for example, the reflection mirror 4 (see FIG. 1) should be replaced with a so-called aberration correcting mirror. Note that the aberration correcting mirror is disposed at a slightly different position from that of the reflection mirror 4.

FIG. 6 is a cross-sectional view showing the aberration correcting mirror. As shown in FIG. 6, the correction angle for aberration is small near the center of the aberration correcting mirror (where the radius of the mirror equals 0), and increases with the mirror radius. The correction angle then decreases to 0 where the radius of the mirror equals R2. Outside the radius R2, the correction angle is opposite to that inside the radius R2. That is, the light flux inside the radius R2 and the light flux outside the radius R2 travel in almost symmetrical directions with respect to light with no aberration (near the radius R2).

Therefore, in the present invention, a region on the objective lens 5 (see FIG. 1) corresponding to the mirror radii from R1 to R3 in FIG. 6 is masked with the masking member 11 (see FIG. 1). In other words, the inner and outer radii of the masking member 11 correspond to the mirror radii R1 and R3 respectively.

Therefore, in the present invention adopting the masking member 11 and the reflection mirror 4 having a flat reflecting surface instead of an aberration correcting mirror, the light flux having passed inside the masking member 11 has such relatively small aberration that there occurs no problem in practice. However, the light flux having passed outside the masking member 11 has large aberration and cannot be converged.

Therefore, the present invention allows a thick (e.g., 1.2 mm) low-density disk to be stably reproduced with an optical system designed for a thin (e.g., 0.6 mm) high-density disk, by providing the masking member 11 on the objective lens 5 and using the light flux having passed inside the masking member 11 with relatively small aberration.

As to reproduction of the CD 12, an expansion of the outer radius of the masking member 11 can reduce affection of aberration. Therefore, a single device can stably reproduce both the high-density disk 1 and the CD 12 whose thicknesses are different from each other, by using the masking member 11 made of a half-transparent material, and suitably choosing the transmittance thereof and the masked region (i.e., the inner and outer radii of the masking member 11).

The light with which the high-density disk 1 and CD 12 are irradiated is symmetrical to the light reflected by the high-density disk 1 and CD 12 with respect to the optical axis. The center (optical axis) of the ringshaped masking member 11 coincides with the center (optical axis) of the objective lens 5. Therefore, the light that has passed through the objective lens 5 without being blocked by the masking member 11 is not blocked by the masking member 11 after being reflected by the high-density disk 1 or CD 12. If the light that radiates from the light source 2 and is supposed to be blocked by the masking member 11 passes through the masking member 11, the light is blocked by the masking member 11 at the symmetrical position after being reflected by the high-density disk 1 or CD 12. In such a case, the quantity of light received by a light receiving element (not shown) is reduced, but the spot formed on the high-density disk 1 and CD 12 is not distorted.

The description so far of the present embodiment have explained a method of reproducing information stored on information recording media whose thicknesses are different from each other with a single optical system by partly blocking the light flux 6 striking the objective lens 5 with the masking member 11 or allowing some of the light flux 6 striking the objective lens 5 to pass through masking member 11. However, the practically the same effect as the present embodiment can be produced by, instead of providing the masking member 11, changing the shape of the region on the surface of the objective lens 5 where the masking member 11 would be provided, so that the light striking the objective lens 5 is, for example, dispersed.

Figure 7:
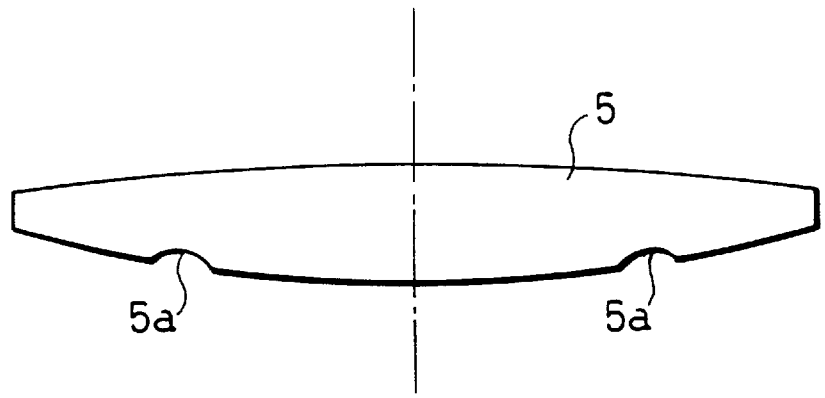
FIG. 7 is a cross-sectional view showing an objective lens of another shape.
Figure 8:
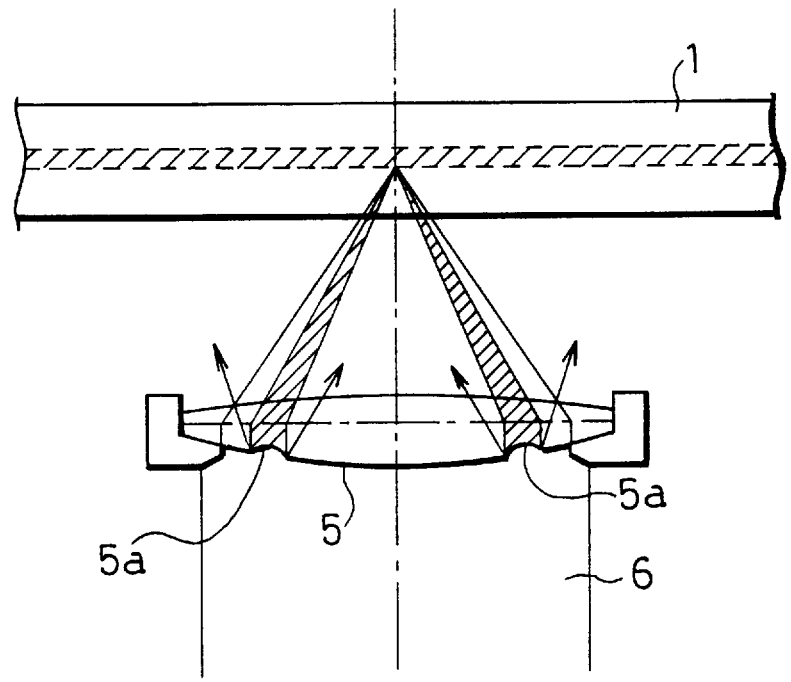
FIG. 8 is an explanatory view illustrating reproduction of a high-density disk with the objective lens.
Figure 9:
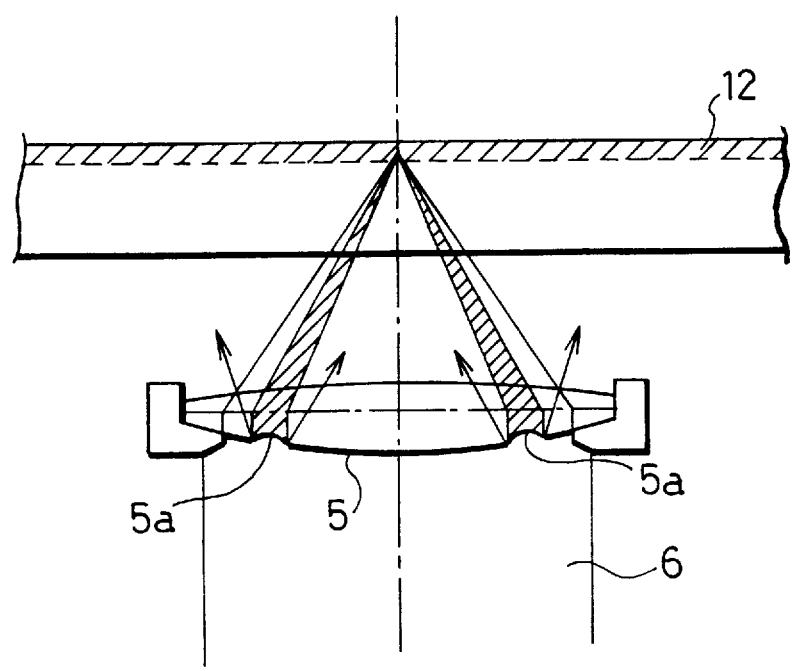
FIG. 9 is an explanatory view illustrating reproduction of a CD with the objective lens.
Figure 10A:
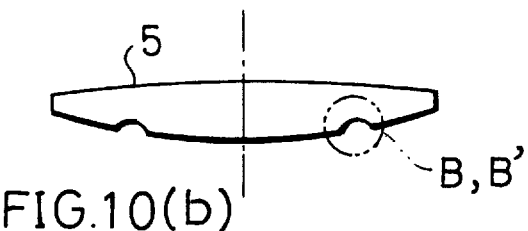
FIG. 10(a) is a cross-sectional view showing an objective lens of even another shape.
Figure 10B:
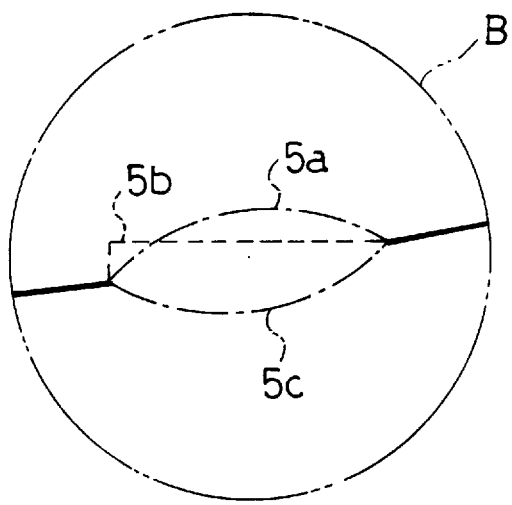
FIG. 10(b) is an enlarged view of Section B of FIG. 10(a)
Figure 10C:
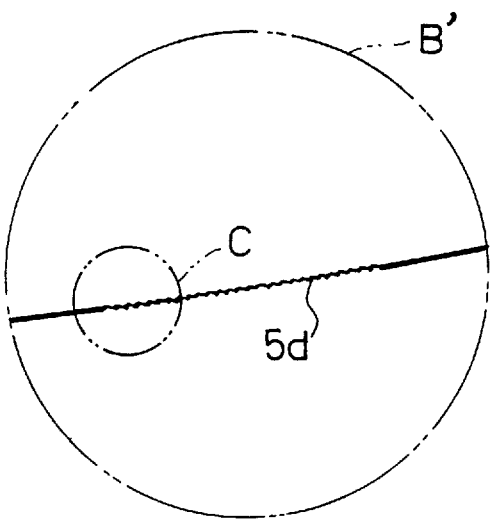
FIG. 10(c) is an enlarged view of Section B' of FIG. 10(a)
Figure 10D:
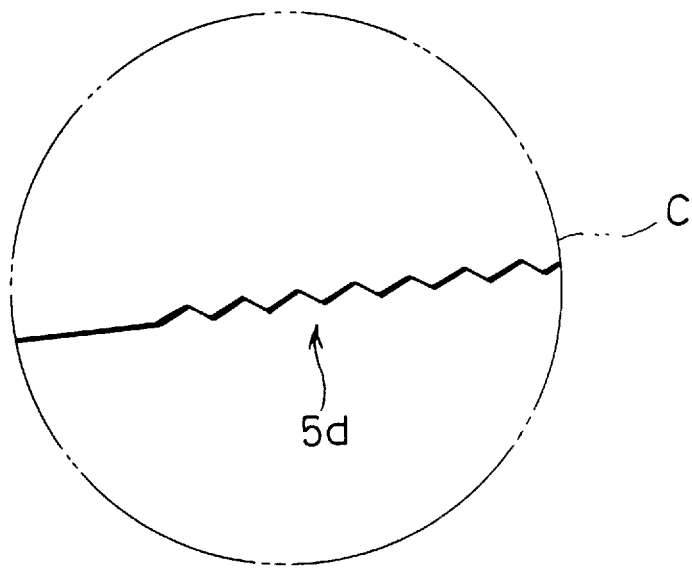
FIG. 10(d) is an enlarged view of Section C of FIG. 10(c).

For example, as shown in FIG. 7, a concave surface 5a is formed in a ring shape where the masking member 11 would be provided on the surface of the objective lens 5 which the light flux strikes. The concave surface 5a disperses the light flux striking the concave surface 5a of the objective lens 5 as shown in FIGS. 8 and 9. As a result, that light flux is not converged on the signal surface of the high-density disk 1 and CD 12.

Alternatively, instead of forming the concave surface 5a, for example, a flat surface 5b having an L-shaped cross-section or a convex surface 5c is formed where the masking member 11 would be provided, as shown in FIG. 10(*b*) which is an enlarged view of Section B of FIG. 10(*a*). Also, a concave-convex surface 5d having a series of small concaves and convexes (so-called crepe, crimp or ground glass surface) may be alternatively formed, as shown in FIG. 10(*c*) which is an enlarged view of Section B' of FIG. 10(*a*) and as shown in FIG. 10(*d*) which is an enlarged view of Section C of FIG. 10(*c*). A light flux striking the flat surface 5b is not converged thereby, because the incident surface is flat. A light flux striking the flat surface 5c is converged thereby far before reaching the information recording medium, not being converged on the information recording medium. A light flux striking the flat surface 5d is dispersed thereby, not being converged on the information recording medium.

Figure 11B:
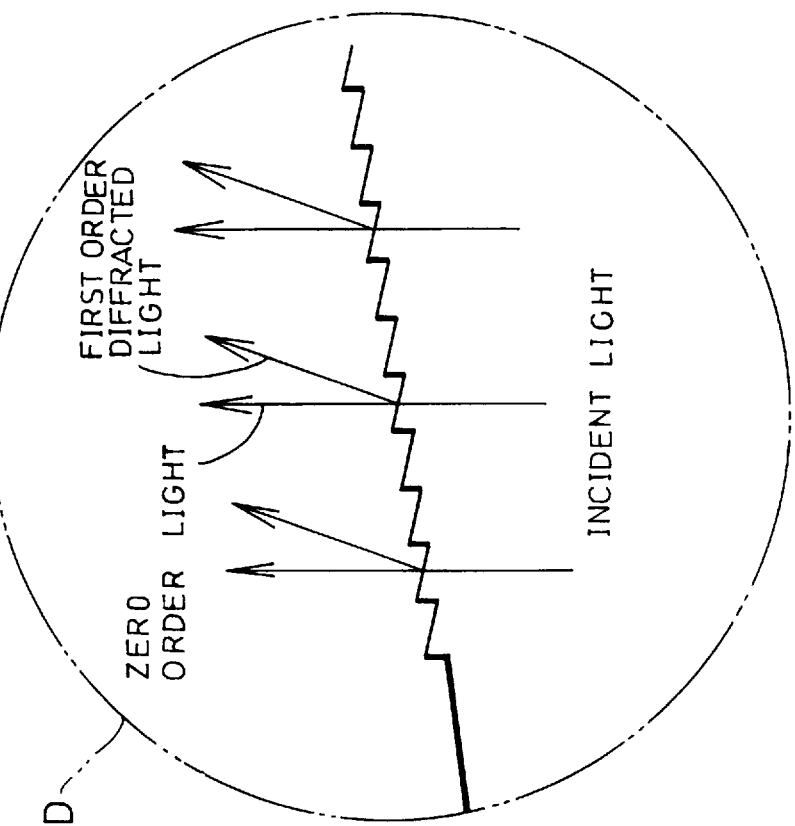
FIG. 11(b) is an enlarged view of Section D of FIG. 11(a).
Figure 11A:
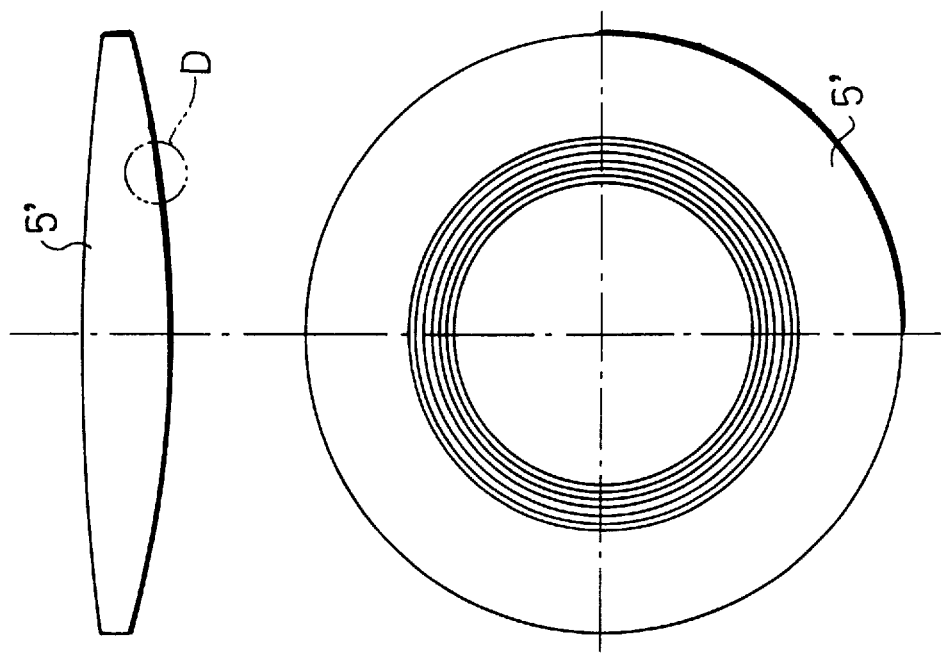
FIG. 11(a) is a cross-sectional view and a plan view showing a hologram lens.
Figure 12:
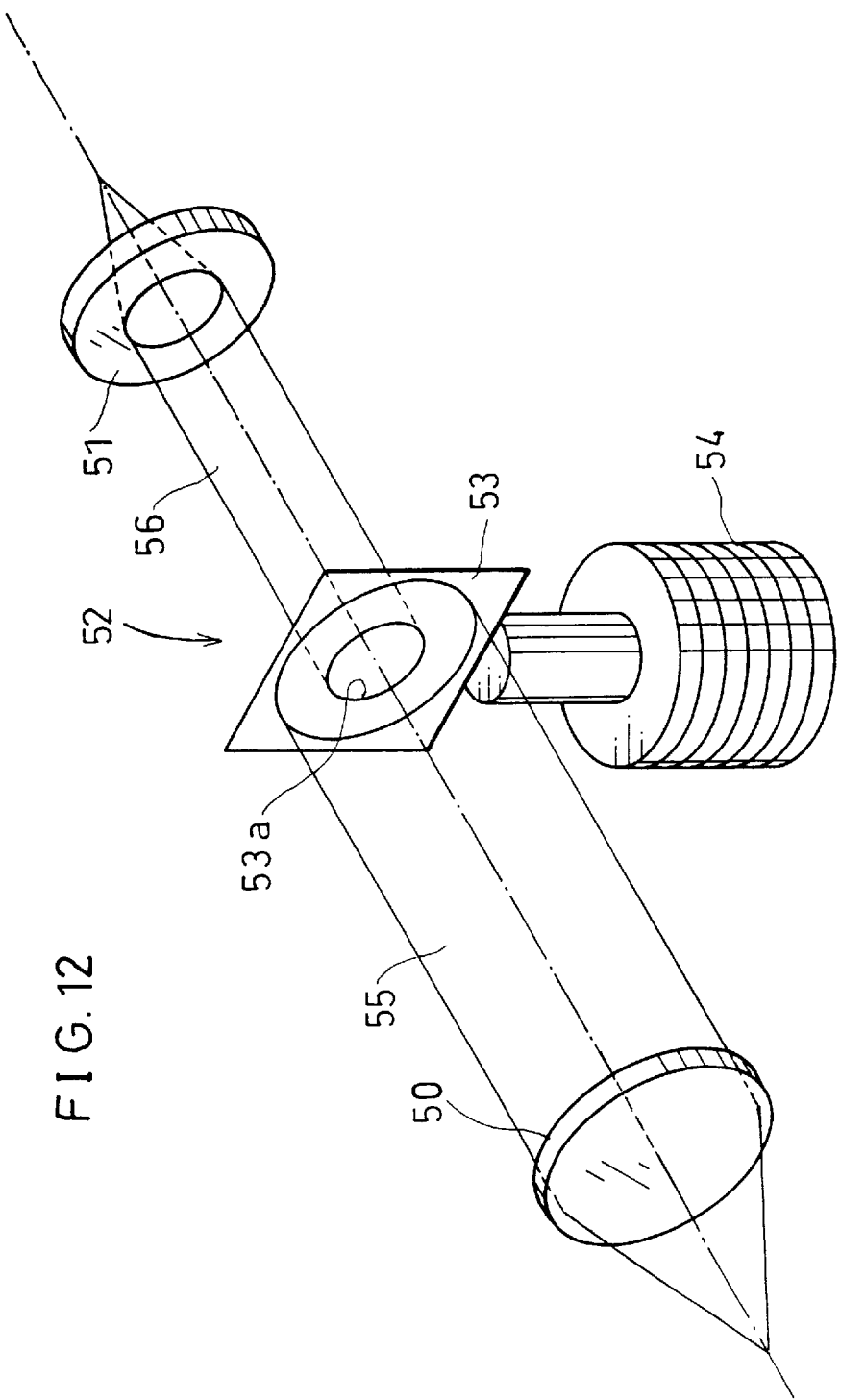
FIG. 12 is a perspective view showing a configuration example of an optical recording and reproducing device disclosed in a prior-art patent application.
Figure 13:
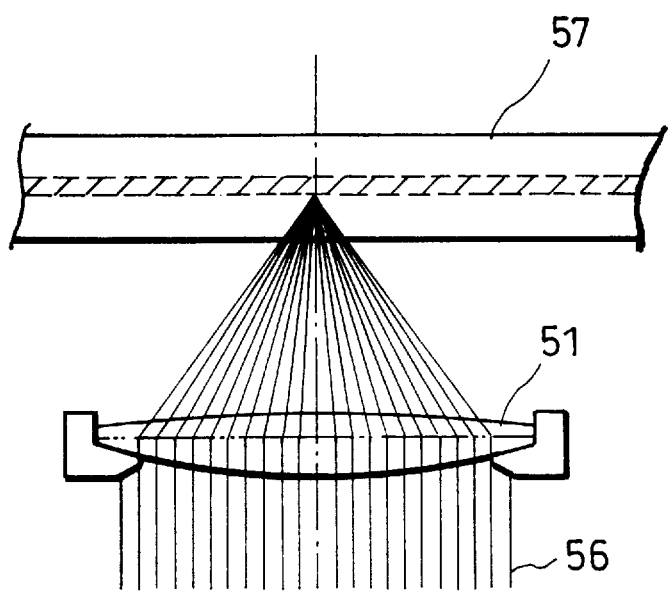
FIG. 13 is an explanatory view illustrating reproduction of a high-density disk with the optical recording and reproducing device.

Alternatively, as shown in FIG. 11(*a*), the objective lens 5 is replaced with a hologram lens 5' having concentric concave and convex portions that are formed where the masking member 11 would be provided. A zero order light simply passes through the lens, whereas first order diffracted light is dispersed, as shown in FIG. 11(*b*) which is an enlarged view of Section D of FIG. 11(*a*).

The objective lens 5 may further vary in its shape. Any shape, except an ordinary shape, serves the purpose to block the light. However, a shape distinctly different from the ordinary shape serves the purpose better and eliminates a possibility of the blocked light interfering with the necessary light, producing a better result.

The invention is not limited by the description of the present embodiment that has only explained reproduction of information on the high-density disk 1 and CD 12. The invention produces the same effect for recording and erasure of information on the information recording media as it does for reproduction thereof.

As described so far, the optical recording and reproducing device in accordance with the present invention is an optical recording and reproducing device for recording, reproducing and erasing information by irradiating an information recording medium with a light beam that has radiated from a light source and then passed through an objective lens, and is characterized in that it includes light blocking means, provided in an optical path between the light source and the information recording medium in a ring shape that is concentric with the objective lens, for blocking a part of the light beam.

Therefore, no device is needed for pushing/pulling a member for limiting the radius of the light beam into/out of the optical path. A light spot of a size suitable to the information recording medium can be always formed on the information recording medium, simply by placing the light blocking means in the optical path between the light source and the information recording medium. Since the configuration needs no such conventionally essential device, the configuration can simplify and thereby reduce the size of the information recording and reproducing device, and can also reduce the number of components and thereby largely cut the cost of the information recording and reproducing device. Also, since the configuration does not require switching of the effective NA of the objective lens according to the thickness of the information recording medium, the configuration can minimize the start-up time of the player.

Preferably, the optical recording and reproducing device in accordance with the present invention is characterized in that the light blocking means is provided on the objective lens, or provided so as to move in an interlocked manner with a shift of the objective lens.

In the configuration, the light blocking means is provided on the objective lens, or provided so as to move in an interlocked manner with a shift of the objective lens. Therefore, even when the objective lens moves, for example, in a track direction of the information recording medium, a part of the light beam is properly blocked, and a light beam not having blocked is converged by the objective lens to form a light spot on the information recording medium.

A conventional member for limiting the radius of the light beam striking the objective lens, since being provided separately from the objective lens, is independent from a shift of the objective lens. If the objective lens moves, for example, in a track direction of the information recording medium, the conventional member does not follow that movement of the objective lens. As a result, the light beam striking the objective lens, whose radius is limited by the conventional member, is displaced from an original optical path for accurately striking the objective lens. The light beam, not converged correctly, cannot form a suitably sized light spot on the information recording medium.

By contrast, In the configuration in accordance with the present invention, the light blocking means is provided on the objective lens, or provided so as to move in an interlocked manner with a shift of the objective lens. Therefore, even when the objective lens moves in a track direction of the information recording medium, the light blocking means follows that movement. As a result, unlike the conventional configuration where the light beam striking the objective lens is displaced from an original optical path for accurately striking the objective lens, the light beam always strikes the objective lens properly without being affected by the movement of the objective lens.

The configuration, therefore, can form a suitably sized light spot on the information recording medium without being affected by, for example, the movement of the objective lens. Consequently it is possible to offer a reliable and high quality information recording and reproducing device which is capable of stably recording, reproducing and erasing information even if the objective lens moves.

Preferably, the optical recording and reproducing device in accordance with the present invention is characterized in that an objective lens designed for a first information recording medium converges a light beam having passed inside the light blocking means on a second information recording medium for recording, reproduction, and erasure of information on the second information recording medium, the second recording medium being composed of a substrate of a different thickness from that of a substrate of the first information recording medium.

With the configuration, even when the objective lens designed for the first information recording medium is used for recording, reproduction, or erasure of information on the second information recording medium composed of a substrate of a different thickness from that of a substrate of the first information recording medium, the objective lens converges the light beam having passed inside the light blocking means on the second information recording medium.

Consequently, the above objective lens allows information to be stably recorded, reproduced, and erased on the second information recording medium.

Conventionally, the above objective lens, if used for recording, reproduction, or erasure of information on the second information recording medium, causes aberration and cannot form a light spot of a size suitable to the second information recording medium. By contrast, the configuration in accordance with the present invention, enabling the light beam having passed inside the light blocking means to be converged, can reduce affection of aberration to a degree that the affection is negligible, and form a sufficiently small light spot.

Consequently, even when the objective lens designed for the first information recording medium is used for recording, reproduction, or erasure of information on the second information recording medium composed of a substrate of a different thickness from that of a substrate of the first information recording medium, the configuration can greatly reduce affection of aberration. Therefore, a single optical system can stably record, reproduce, and erase information on information recording media whose thicknesses and recording densities are different from each other.

Preferably, the optical recording and reproducing device in accordance with the present invention is characterized in that the light blocking means is half-transparent.

Since the light blocking means is half-transparent, the configuration reduces the quantity of light blocked by the light blocking means. That is, the light beam having reached the light blocking means is not completely blocked, and a part of the light beam passes the light blocking means. The configuration therefore increases the quantity of light with which the information recording medium is irradiated, and thereby allows information to be stably recorded, reproduced, and erased even on an information recording medium of a low reflectance and a multilayer information recording medium.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An optical recording and reproducing device, comprising:

a light source for irradiating an information recording medium with a light beam;

an objective lens for converging the light beam on the information recording medium; and light blocking means, provided in an optical path between said light source and the information recording medium, for blocking a part of the light beam, said light blocking means being formed in a ring shape that is concentric with said objective lens, said light blocking means being provided so as to move in an interlocked manner with a shift of said objective lens.

2. The optical recording and reproducing device as defined in claim 1, wherein said light blocking means is provided on said objective lens.

3. The optical recording and reproducing device as defined in claim 2, further comprising:

a supporting member, provided along a periphery of said objective lens, for serving as a reference in deciding the position of said light blocking means; and a connecting member for connecting said supporting member and said light blocking member.

4. An optical recording and reproducing device, comprising:
- a light source for irradiating an information recording medium with a light beam;
- an objective lens for converging the light beam on the information recording medium; and
- light blocking means, provided in an optical path between said light source and the information recording medium, for blocking a part of the light beam, said light blocking means being formed in a ring shape that is concentric with said objective lens;
- wherein said light blocking means permits light to pass both inside and outside said ring shape that is concentric with said objective lens.

5. An optical recording and reproducing device, comprising:
- a light source for irradiating an information recording medium with a light beam;
- an objective lens for converging the light beam on the information recording medium; and
- light blocking means, provided in an optical path between said light source and the information recording medium, for blocking a part of the light beam, said light blocking means being formed in a ring shape that is concentric with said objective lens;
- wherein said objective lens is designed for a first information recording medium, and
- said objective lens nevertheless converges a light beam having passed inside said light blocking means on a second information recording medium for recording, reproduction, and erasure of information on the second information recording medium, the second recording medium being composed of a substrate of a different thickness from that of a substrate of the first information recording medium.

6. An optical recording and reproducing device, comprising:
- a light source for irradiating an information recording medium with a light beam;
- an objective lens for converging the light beam on the information recording medium; and
- light blocking means, provided in an optical path between said light source and the information recording medium, for blocking a part of the light beam, said light blocking means being formed in a ring shape that is concentric with said objective lens;
- wherein said light blocking means is half-transparent.

7. An optical recording and reproducing device, comprising:
- a light source for irradiating an information recording medium with a light beam;
- an objective lens for converging the light beam on the information recording medium; and
- light blocking means, provided in an optical path between said light source and the information recording medium, for blocking a part of the light beam, said light blocking means being formed in a ring shape that is concentric with said objective lens;
- wherein said light blocking means is opaque.

8. An optical recording and reproducing device, comprising:
- a light source for irradiating an information recording medium with a light beam;
- an objective lens for converging the light beam on the information recording medium; and
- light blocking means, provided in an optical path between said light source and the information recording medium, for blocking a part of the light beam, said light blocking means being formed in a ring shape that is concentric with said objective lens;
- wherein said light blocking means is made of a dielectric multilayer film.

9. The optical recording and reproducing device as defined in claim 8,
wherein said light blocking means has a light transmittance regulated by a thickness of the dielectric multilayer film.

10. An optical recording and reproducing device, comprising:
- a light source for irradiating an information recording medium with a light beam; and
- an objective lens for converging the light beam on the information recording medium,
- wherein said objective lens includes a non-light-converging section, provided in a ring shape that is concentric with said objective lens, for preventing a part of the light beam passing through said objective lens from being converged on the information recording medium.

11. The optical recording and reproducing device as defined in claim 10,
wherein the non-light-converging section is formed to be of a concave shape in a cross-sectional view thereof.

12. The optical recording and reproducing device as defined in claim 10,
wherein the non-light-converging section is formed to be of an L-shape in a cross-sectional view thereof.

13. The optical recording and reproducing device as defined in claim 10,
wherein the non-light-converging section is formed to be of a convex shape in a cross-sectional view thereof.

14. The optical recording and reproducing device as defined in claim 10,
wherein the non-light-converging section is formed to be of a crepe shape in a cross-sectional view thereof.

15. An optical recording and reproducing device, comprising:
- a light source for irradiating an information recording medium with a light beam; and
- an objective lens for converging the light beam on the information recording medium,
- wherein said objective lens is a hologram lens having on a part thereof a concave-convex section formed by a series of concentric concave and convex portion, so as to prevent a light beam passing the concave-convex section from being converged on the information recording medium.

* * * * *